Sept. 7, 1926.
S. M. MOSES
1,599,341
HEATER
Filed March 14, 1924
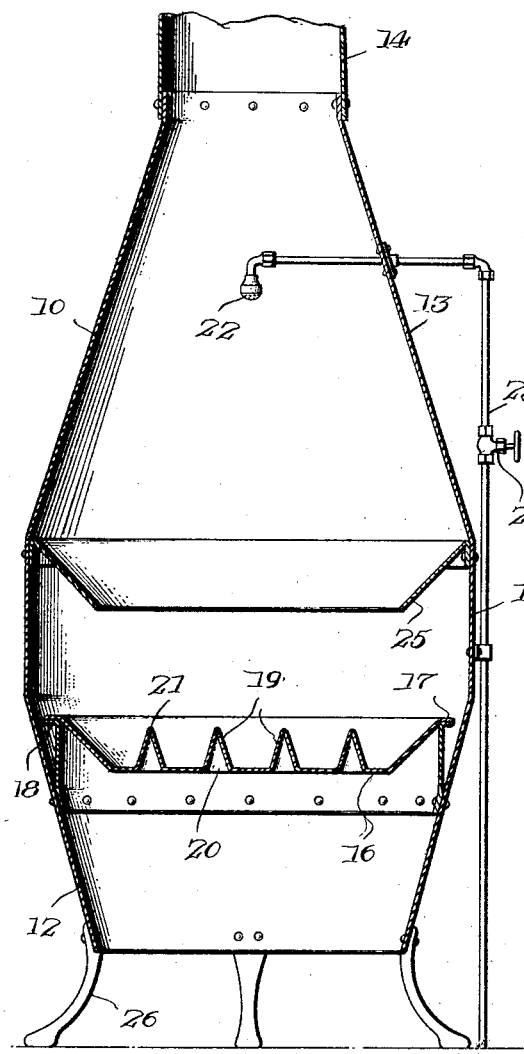
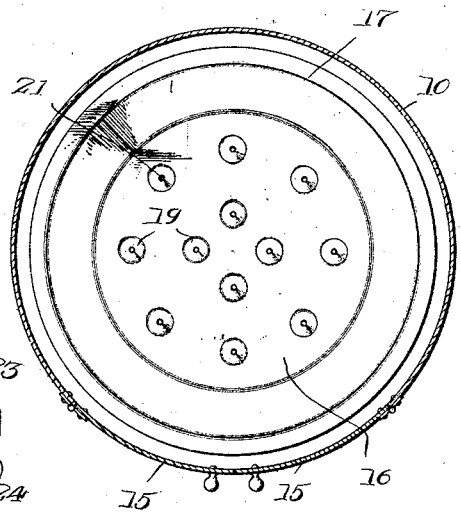
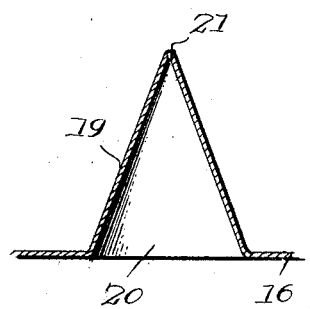
Samuel M. Moses
INVENTOR
BY Victor J. Evans
ATTORNEY Patented Sept. 7, 1926.

1,599,341

UNITED STATES PATENT OFFICE.

SAMUEL M. MOSES, OF MANNING, TEXAS.

HEATER.

Application filed March 14, 1924. Serial No. 699,260.

This invention relates to heaters and has for an object the provision of a heater which is capable of utilizing crude oil as a fuel in a practical and efficient manner.

Another object of the invention is the provision of an oil collecting pan for a heater of the above character which will prevent the escape of excess oil and which in addition will provide for the passage of a proper amount of air to promote combustion.

Another object of the invention is the provision of means for removably supporting the pan, so that the latter may be readily cleaned, or a new pan easily installed.

Another object of the invention is the provision of means for directing the products of combustion inwardly and downwardly toward the center of the heater so that the said products of combustion will be properly confined.

With the above and other objects in view, the invention further includes the following novel features and details of construction, to be hereinafter more fully described, illustrated in the accompanying drawings and pointed out in the appended claim.

In the drawings:—

Figure 1 is a vertical sectional view of a heater constructed in accordance with the invention.

Figure 2 is a horizontal section.

Figure 3 is a detail perspective view of the oil pan.

Referring to the drawings in detail wherein like characters of reference denote corresponding parts, the improved heater is shown as comprising a casing or drum 10 having an intermediate cylindrical portion 11 and lower and upper tapered portions 12 and 13, the lower end of the former being open as shown while the upper end of the upper tapered portion 13 is also open and has connection with a smoke pipe 14 as shown. The casing or drum is provided with an opening which may be closed by hinged doors 15.

Located within the heater is an oil pan 16 which is adapted to prevent the escape of excess oil. This pan is of dish-like formation and is provided with an outwardly extending flange 17 which is adapted to be removably positioned upon the upper free edge of an annular flange 18, the lower edge of which is secured to the inner wall of the casing while the upper edge is spaced from said wall. The pan 16 is constructed so as to admit air to the interior of the casing to promote combustion and to provide for this and at the same time prevent the escape of oil from the pan, the latter is provided with a plurality of upwardly extending hollow conical members 19 which are positioned over openings 20 provided in the pan and whose apices are provided with openings 21.

Located within the casing above the pan 16 is a spray nozzle 22 which is connected to one end of a fuel supply pipe 23, the latter being in turn connected to a source of crude oil or other source of fuel supply, a valve 24 serving to control the passage of fuel through the pipe.

Secured to the inner wall of the casing 10 is an annular baffle wall 25, one edge of the said baffle wall being secured to the casing with the wall extending inwardly and downwardly toward the center of the casing, so that the products of combustion will be directed inwardly and downwardly and will be thus properly confined.

The heater may be supported upon suitable legs 26.

The invention is susceptible of various changes in its form, proportions and minor details of construction and the right is herein reserved to make such changes as properly fall within the scope of the appended claim.

Having described the invention what is claimed is:—

A heater comprising a drum open at the bottom, an annular flange having its lower edge secured to the inner wall of the drum and its upper edge spaced from said wall, a substantially dish-shaped oil pan having an outwardly disposed flange extending around its edge for engagement with the upper edge of the first mentioned flange to removably support the pan, a plurality of vertically disposed members carried by the pan and having openings therethrough for the passage of air, a nozzle located within the drum above the pan, a fuel feed line connected to the nozzle and an inwardly and downwardly extending baffle wall located between the nozzle and pan and having its outer edge secured to the drum and its inner edge extending inwardly within the radius of the outer edge of the oil pan.

In testimony whereof I affix my signature.

SAMUEL M. MOSES.